March 18, 1958  D. N. FANTACI  2,827,262
HYDRAULIC AUTO JACK
Filed May 5, 1954  2 Sheets-Sheet 1
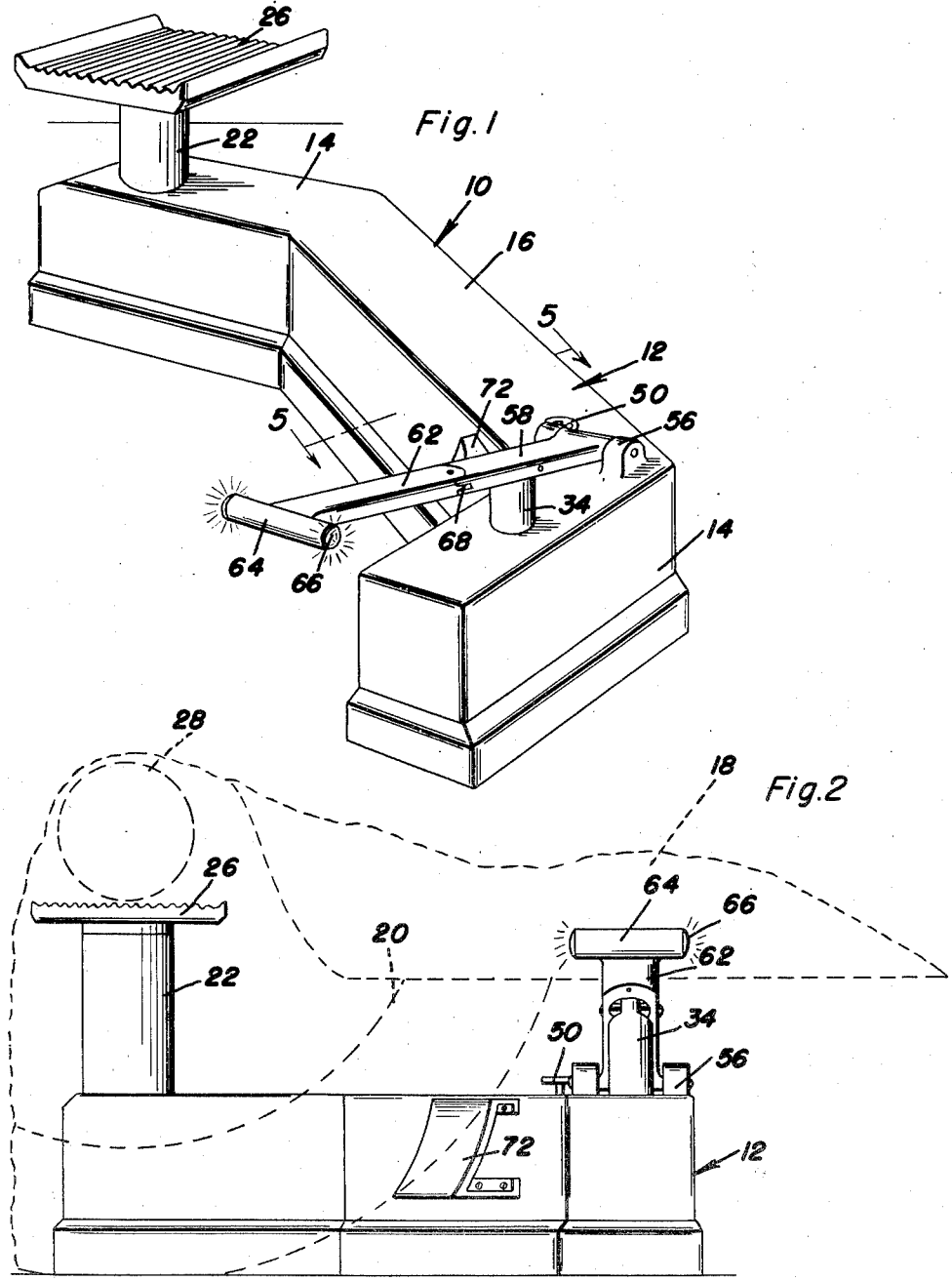
Dominic N. Fantaci  INVENTOR.
BY *Attorneys*

March 18, 1958     D. N. FANTACI     2,827,262
HYDRAULIC AUTO JACK
Filed May 5, 1954     2 Sheets-Sheet 2
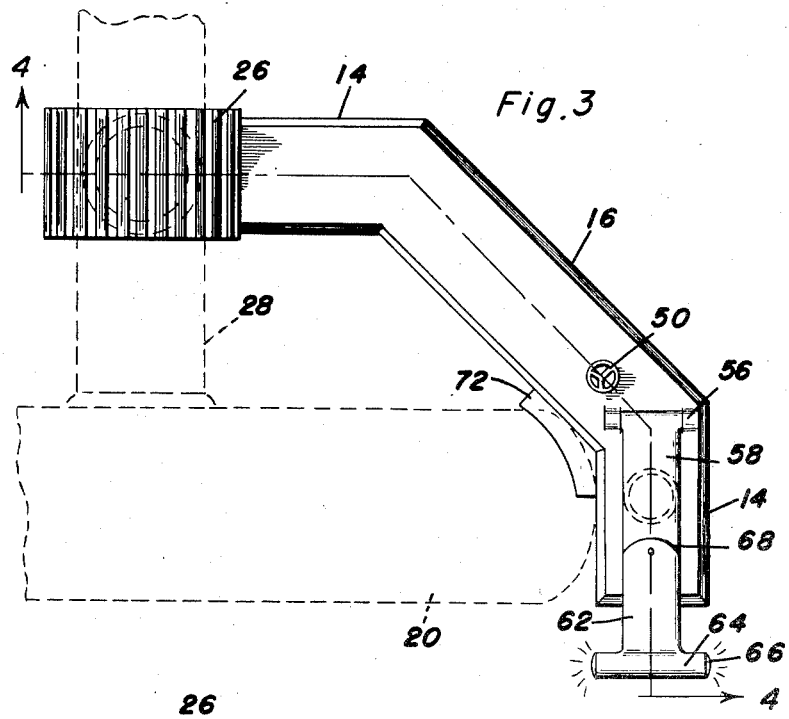
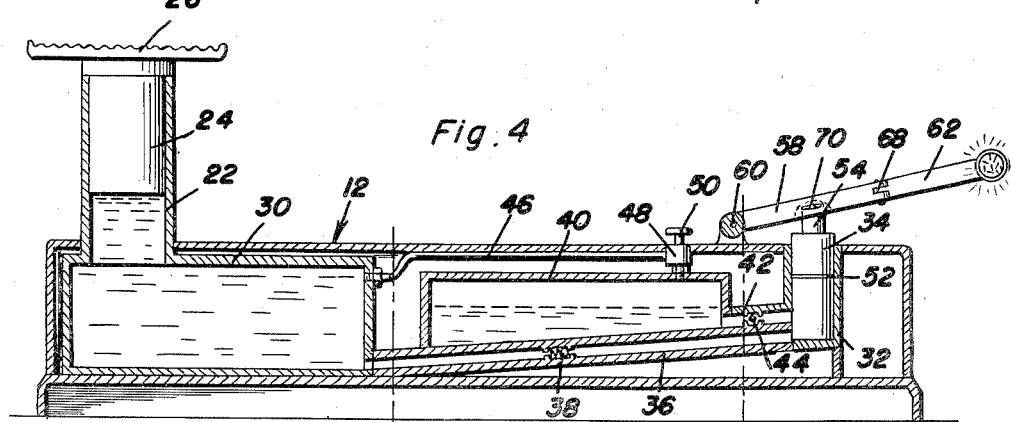
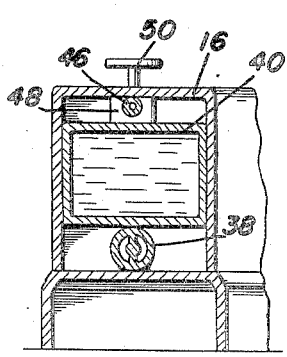
Dominic N. Fantaci
INVENTOR.

United States Patent Office 2,827,262
Patented Mar. 18, 1958

2,827,262

HYDRAULIC AUTO JACK

Dominic N. Fantaci, Babylon, N. Y.

Application May 5, 1954, Serial No. 427,705

1 Claim. (Cl. 254—93)

This invention relates to a hydraulic auto jack, and more specifically provides a jack wherein the driver of an automobile may easily and quickly replace the individual ground engaging wheels without the usual necessity of the usual labor in placing the lifting member under the axle housing or other portions of the automobile undercarriage.

An object of this invention is to provide a hydraulic auto jack having an elongated horizontally disposed housing with a lifting member on one end and an actuation means on the other end and a locating member for engagement with the automobile wheel for locating the lifting member under a predetermined point of the automobile undercarriage wherein the actuating means for the lifting member is disposed exteriorly of the vehicle, thereby permitting easy access and operation thereof.

Another object of this invention is to provide a hydraulic automobile jack which is simple in construction, easy to utilize, efficient in operation, safe, well adapted for its intended purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the hydraulic auto jack of the present invention;

Figure 2 is a side elevation showing the jack of the present invention in position under an automobile;

Figure 3 is a top plan view of the construction of Figure 2 showing the locating means and the orientation of the various elements of the hydraulic auto jack;

Figure 4 is a longitudinal, vertical sectional view taken substantially along section line 4—4 of Figure 3 showing the details of construction of the hydraulic jack; and Figure 5 is a transverse, vertical section taken substantially along section line 5—5 of Figure 1 showing other details of the construction of the hydraulic jack.

Referring now specifically to the drawings, it will be seen that the numeral 10 generally designates the hydraulic auto jack of the present invention, including a generally elongated housing 12 having end portions 14 positioned in right angular relation to each other and connected by an intermediate portion 16 which is attached to the end portions 14 in oblique angular relationship for a purpose described hereinafter.

It will be seen that the housing 12 is disposed in horizontal position on a suitable supporting surface and is adapted to be positioned under the body of an automobile 18 to one side of a ground engaging wheel 20. The end portion 14 of the housing 12 which is positioned under the body 18 of the automobile is provided with an upstanding cylinder 22 having a piston 24 slidably mounted therein with an enlarged engaging member 26 on the upper end of the piston 24 for engaging the axle housing 28 of the vehicle 18. A suitable pressure tank 30 is provided in the cylinder 22 and the cylinder 22 is integrally formed therewith and extends vertically above the pressure tank 30. A pump cylinder 32 is provided in the end portion of the housing 14 that is positioned exteriorly of the vehicle body 18 and a vertically reciprocating piston 34 is slidably received in the cylinder 32. An interconnecting conduit line 36 is in communication with the lower end of the cylinder 32 of the pressure tank 30 and is inclined downwardly from the cylinder 32 to the pressure tank 30 and equipped with a spring loaded check valve 38 for permitting flow of fluid in a single direction from the cylinder 32 into the pressure tank 30, thereby permitting pressure to build up in the tank 30.

A fluid reservoir 40 is positioned adjacent the cylinder 32 and includes a conduit 42 discharging fluid from the reservoir 40 into the cylinder 32. A check valve 44 is positioned in fluid line 42 for permitting flow of fluid from the reservoir 40 into the cylinder 32 and preventing the reverse flow of fluid from the cylinder 32 into the reservoir 40 when the piston 34 is reciprocated.

A return line or exhaust line 46 is connected to the upper end of the pressure tank 30 and discharges into the reservoir 40 and a cut-off valve 48 is provided in the exhaust line 46 with a manually operated valve stem 50 projecting above the upper surface of the housing 12 for actuation by the operator of the jack 10.

The bleed valve 48 permits discharge of the pressurized fluid from the pressure tank 30 back into the reservoir 40, thereby permitting the piston 24 to be retracted into the cylinder 22, thereby lowering the lift member 26. The piston 34 is provided with a suitable sealing ring 52 for engaging the side walls of the cylinder 32, thereby sealing the cylinder 32 and a rod 54 projects upwardly from the piston 34 for a purpose described hereinafter.

A pair of upstanding lugs 56 are provided on the upper surface of the housing 12 adjacent the cylinder 34 for pivotally receiving one end of an elongated handle 58 on a suitable pivot pin 60. The handle 58 is provided with a foldable outer section 62 having a T-shaped handle 64 for engagement by the jack operator. The ends of the T-shaped handle 64 are provided with suitable reflectors 66 which reflect the light of approaching automobiles thereby warning the approaching automobiles of the disabled automobile that is being raised or lowered by the jack 10. The handle 58 may be as long as desired and folding in any suitable manner, such as by the joint illustrated by the numeral 68. The piston rod 54 extending up from the piston 34 is connected to the handle 58 by a suitable pin and slot connection 70 which permits pivotal movement of the handle 58 and vertical reciprocating movement of the piston 34.

Referring now more specifically to Figures 2 and 3, it will be seen that a concavely curved locating member 72 is secured to the housing 12. The locating member 72 is adapted to engage the ground engaging wheel or tire 20, thereby positioning the housing 12 in correct relationship to the vehicle body 18 and positioning the lifting member 26 under the axle housing 28 and permitting the handle 58 to project outwardly from the side of the vehicle body 18 for access by the operator of the jack, thereby permitting the jack operator to raise and lower the vehicle body 18 without the necessity of looking under the car while positioning the lifting member 26.

In operation, the jack is disposed under the vehicle body 18 and the locating member 72 is positioned against the inner corner of the vehicle tire 20 and the end portion 14 having the handle 58 thereon is disposed vertically across the front of the tire 20, thereby assuring that the lifting member 26 will be disposed under the axle housing 28, wherein the handle 58 may be actuated thereby raising the lifting member 26. The actuation of the handle 58 reciprocates the piston 34, thereby pumping fluid into the pressure tank 30 and raising the piston 24 in the cylinder 22. It will be understood that the valve 48 and the exhaust line 46 must be closed while raising the piston 24 and the lifting member 26. When it is desired to lower the lifting member 26, the valve 48 is opened by operating the manual handle 58, thereby permitting the pressure in the pressure tank 30 to be exhausted to the reservoir 40, thereby permitting the piston 24 to lower itself into the cylinder 22. Obviously, the piston 24 and cylinder 22 may be provided with interengaging means for limiting the upward movement of the piston 24 and the relative sizes of the pistons 34 and 24 may be calculated, depending upon the weights to be lifted by the jack 10. The reflector 66 on the handle 58 provides protection for the operator of the jack 10 after dark, when the lights of approaching automobiles will be reflected by the reflector 66, thereby warning the drivers of the approaching cars of the disabled condition of the automobiles sitting alongside a thoroughfare. The device may be constructed of any suitable sizes for easy storage and portability in the usual trunk compartment of an automobile, and it will be seen that the particular orientation of the lifting member 26 in relation to the locating member 72 permits the driver of an automobile to easily and quickly replace the vehicle tires without performing the usual contortions incidental to placing a jack under the undercarriage of the automobile.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A jack for engaging the undercarriage of an automobile having a ground engaging wheel comprising an elongated angulated housing positioned horizontally on a supporting surface, a vertically movable lifting member at one end of said housing for engaging the undercarriage, actuation means for the lifting member at the other end of said housing and positioned exteriorly of the automobile, and locating means on said housing arranged for positioning the lifting member under a predetermined point of the undercarriage, the locating means being engaged with the ground engaging wheel, said lifting member including a fluid operated piston and cylinder arrangement, and said actuation means includes a fluid pump having a reciprocating piston, a handle for moving said piston, an interconnecting fluid line between the pump and cylinder, a check valve in said line, and a control valve for exhausting pressure fluid from said cylinder for raising and lowering said lifting member, said housing being provided with end sections disposed in right angular relation and an intermediate portion connected to said end portions in oblique angular relation.

References Cited in the file of this patent

UNITED STATES PATENTS

| | | |
|---|---|---|
| 2,034,605 | Carman | Mar. 17, 1936 |
| 2,284,958 | Grime | June 2, 1942 |
| 2,497,960 | Salzmann | Feb. 21, 1950 |